(12) United States Patent
Hull et al.

(10) Patent No.: US 7,424,129 B2
(45) Date of Patent: Sep. 9, 2008

(54) PRINTING SYSTEM WITH EMBEDDED AUDIO/VIDEO CONTENT RECOGNITION AND PROCESSING

(75) Inventors: Jonathan J. Hull, San Carlos, CA (US);
Berna Erol, Cupertino, CA (US); Jamey Graham, San Jose, CA (US); Peter E. Hart, Menlo Park, CA (US);
Dar-Shyang Lee, Union City, CA (US);
Kurt W. Piersol, Santa Cruz, CA (US);
Daniel G. Van Olst, San Francisco, CA (US)

(73) Assignee: Ricoh Company, Ltd, Tokyo (JP)

( * ) Notice: Subject to any disclaimer, the term of this patent is extended or adjusted under 35 U.S.C. 154(b) by 1012 days.

(21) Appl. No.: 10/813,950

(22) Filed: Mar. 30, 2004

(65) Prior Publication Data

US 2005/0008221 A1 Jan. 13, 2005

Related U.S. Application Data

(63) Continuation-in-part of application No. 10/001,895, filed on Nov. 19, 2001, now Pat. No. 7,263,659, and a continuation-in-part of application No. 10/645,821, filed on Aug. 20, 2003, and a continuation-in-part of application No. 10/175,540, filed on Jun. 18, 2002, now Pat. No. 7,215,436, and a continuation-in-part of application No. 10/001,849, filed on Nov. 19, 2001, now Pat. No. 7,263,671, and a continuation-in-part of application No. 10/001,893, filed on Nov. 19, 2001, now Pat. No. 7,266,782, and a continuation-in-part of application No. 10/001,894, filed on Nov. 19, 2001, now Pat. No. 7,149,957, and a continuation-in-part of application No. 10/001,891, filed on Nov. 19, 2001.

(60) Provisional application No. 60/506,303, filed on Sep. 25, 2003, provisional application No. 60/506,302, filed on Sep. 25, 2003.

(51) Int. Cl.
*G06K 9/00* (2006.01)

(52) U.S. Cl. .................. 382/100; 382/173; 382/181

(58) Field of Classification Search ............... 382/100, 382/167, 181, 173; 345/419, 502; 386/54; 446/175; 705/1, 26, 57, 58; 704/272, 231, 704/243, 251; 707/202; 709/233; 715/202, 715/201, 273, 863; 725/18, 19, 22
See application file for complete search history.

(56) References Cited

U.S. PATENT DOCUMENTS 4,133,007 A 1/1979 Wessler et al. ............ 358/409

(Continued)

FOREIGN PATENT DOCUMENTS

CA 2386829 11/2000

(Continued)

OTHER PUBLICATIONS

Dorai et al., "End-to-End Video Text Recognition for Multimedia Content Analysis", IEEE, Aug. 2001, pp. 479-482.*

(Continued)

*Primary Examiner*—Anh Hong Do
(74) *Attorney, Agent, or Firm*—Fenwick & West LLP (57) ABSTRACT

A printing system includes embedded functionality for performing media content recognition and processing. Based on the results of the content recognition and processing performed on the media content, the printing system can generate a paper-based or other printed representation thereof. The printing system may further produce a corresponding electronic representation of the media content, which in combination with the printed representation can be used to view and access the media content. A printing system may also include a media renderer application having a print functionality for printing selected media content.

52 Claims, 5 Drawing Sheets

U.S. PATENT DOCUMENTS

| | | | |
|---|---|---|---|
| 4,205,780 A | 6/1980 | Burns et al. | 235/454 |
| 4,619,522 A | 10/1986 | Imai | 399/55 |
| 4,635,132 A | 1/1987 | Nakamura | 358/296 |
| 4,734,898 A | 3/1988 | Morinaga | 369/30.85 |
| 4,754,485 A | 6/1988 | Klatt | 704/268 |
| 4,807,186 A | 2/1989 | Ohnishi et al. | 714/48 |
| 4,831,610 A | 5/1989 | Hoda et al. | 369/47.23 |
| 4,881,135 A | 11/1989 | Heilweil | 386/107 |
| 4,907,973 A | 3/1990 | Hon | 434/262 |
| 4,998,215 A | 3/1991 | Black et al. | 358/1.6 |
| 5,059,126 A | 10/1991 | Kimball | 434/308 |
| 5,091,948 A | 2/1992 | Kametani | 704/248 |
| 5,093,730 A | 3/1992 | Ishii et al. | 358/296 |
| 5,115,967 A | 5/1992 | Wedekind | 236/46 R |
| 5,136,563 A | 8/1992 | Takemasa et al. | 369/30.84 |
| 5,170,935 A | 12/1992 | Federspiel et al. | 236/44 C |
| 5,220,649 A * | 6/1993 | Forcier | 715/273 |
| 5,231,698 A * | 7/1993 | Forcier | 715/273 |
| 5,237,648 A | 8/1993 | Mills et al. | 715/723 |
| 5,270,989 A | 12/1993 | Kimura | 369/30.93 |
| 5,343,251 A | 8/1994 | Nafeh | 348/571 |
| 5,386,510 A | 1/1995 | Jacobs | 345/505 |
| 5,432,532 A | 7/1995 | Mochimaru et al. | 347/176 |
| 5,436,792 A | 7/1995 | Leman et al. | 361/686 |
| 5,438,426 A | 8/1995 | Miake et al. | 358/403 |
| 5,444,476 A | 8/1995 | Conway | 348/14.1 |
| 5,479,600 A | 12/1995 | Wroblewski et al. | 715/787 |
| 5,480,306 A | 1/1996 | Liu | 434/156 |
| 5,485,554 A | 1/1996 | Lowitz et al. | 358/1.17 |
| 5,493,409 A | 2/1996 | Maeda et al. | 358/296 |
| 5,568,406 A | 10/1996 | Gerber | 702/159 |
| 5,572,651 A | 11/1996 | Weber et al. | 715/863 |
| 5,576,950 A | 11/1996 | Tonomura et al. | 386/121 |
| 5,581,366 A | 12/1996 | Merchant et al. | 358/400 |
| 5,590,257 A * | 12/1996 | Forcier | 715/273 |
| 5,596,698 A | 1/1997 | Morgan | 715/863 |
| 5,617,138 A | 4/1997 | Ito et al. | 348/222.1 |
| 5,624,265 A | 4/1997 | Redford et al. | 404/307 R |
| 5,627,936 A | 5/1997 | Prasad et al. | 386/96 |
| 5,628,684 A | 5/1997 | Bouedec | 463/17 |
| 5,633,723 A | 5/1997 | Sugiymana et al. | 358/296 |
| 5,640,193 A | 6/1997 | Wellner | 725/100 |
| 5,661,506 A | 8/1997 | Lazzouni et al. | 345/179 |
| 5,661,783 A | 8/1997 | Assis | 379/88.01 |
| 5,682,330 A | 10/1997 | Seaman et al. | 358/403 |
| 5,682,540 A | 10/1997 | Klotz, Jr. et al. | 715/209 |
| 5,690,496 A | 11/1997 | Kennedy | 434/307 R |
| 5,706,097 A | 1/1998 | Schelling et al. | 358/296 |
| 5,717,841 A | 2/1998 | Farrell et al. | 358/1.15 |
| 5,721,883 A | 2/1998 | Katsuo et al. | 345/505 |
| 5,729,665 A | 3/1998 | Gauthier | 358/1.18 |
| 5,749,735 A | 5/1998 | Redford et al. | 434/307 R |
| 5,764,368 A | 6/1998 | Shibaki et al. | 358/296 |
| 5,774,260 A | 6/1998 | Petitto et al. | 359/451 |
| 5,793,869 A | 8/1998 | Claflin, Jr. | 380/269 |
| 5,804,803 A | 9/1998 | Cragun et al. | 235/375 |
| 5,845,144 A | 12/1998 | Tateyama et al. | 712/1 |
| 5,884,056 A | 3/1999 | Steele | 715/738 |
| 5,903,538 A | 5/1999 | Fujita et al. | 369/30.76 |
| 5,936,542 A | 8/1999 | Kleinrock et al. | 340/5.61 |
| 5,938,727 A | 8/1999 | Ikeda | 709/218 |
| 5,940,776 A | 8/1999 | Baron et al. | 702/4 |
| 5,941,936 A | 8/1999 | Taylor | 704/503 |
| 5,945,998 A | 8/1999 | Eick | 345/589 |
| 5,949,879 A | 9/1999 | Berson et al. | 713/179 |
| 5,962,839 A | 10/1999 | Eskildsen | 235/472.01 |
| 5,987,226 A | 11/1999 | Ishikawa et al. | 358/1.13 |
| 5,999,173 A | 12/1999 | Ubillos | 715/724 |
| 6,000,030 A | 12/1999 | Steinberg et al. | 726/28 |
| 6,006,241 A | 12/1999 | Purnaveja et al. | 715/205 |
| 6,038,567 A | 3/2000 | Young | 707/103 R |
| 6,043,904 A | 3/2000 | Nickerson | 358/442 |
| 6,076,733 A | 6/2000 | Wilz, Sr. et al. | 235/462.01 |
| 6,076,734 A | 6/2000 | Dougherty et al. | 235/462.01 |
| 6,081,261 A | 6/2000 | Wolff et al. | 345/179 |
| 6,098,106 A | 8/2000 | Philyaw et al. | 709/238 |
| 6,106,457 A | 8/2000 | Perkins et al. | 600/175 |
| 6,108,656 A | 8/2000 | Durst et al. | 707/10 |
| 6,111,567 A | 8/2000 | Savchenko et al. | 715/202 |
| 6,115,718 A | 9/2000 | Huberman et al. | 707/102 |
| 6,118,888 A | 9/2000 | Chino et al. | 382/118 |
| 6,123,258 A | 9/2000 | Iida | 235/375 |
| 6,125,229 A | 9/2000 | Dimitrova et al. | 386/69 |
| 6,138,151 A | 10/2000 | Reber et al. | 709/219 |
| 6,148,094 A | 11/2000 | Kinsella | 382/124 |
| 6,152,369 A | 11/2000 | Wilz, Sr. et al. | 235/462.01 |
| 6,153,667 A | 11/2000 | Howald | 523/160 |
| 6,167,033 A | 12/2000 | Chang et al. | 370/263 |
| 6,170,007 B1 | 1/2001 | Venkatraman et al. | 709/218 |
| 6,175,489 B1 | 1/2001 | Markow et al. | 361/683 |
| 6,189,009 B1 | 2/2001 | Stratigos et al. | 707/10 |
| 6,193,658 B1 | 2/2001 | Wendelken et al. | 600/437 |
| 6,199,042 B1 | 3/2001 | Kurzweil | 704/260 |
| 6,256,638 B1 | 7/2001 | Dougherty et al. | 707/104.1 |
| 6,296,693 B1 | 10/2001 | McCarthy | 96/117.5 |
| 6,297,812 B1 | 10/2001 | Ohara et al. | 345/173 |
| 6,297,851 B1 | 10/2001 | Taubman et al. | 348/572 |
| 6,298,145 B1 | 10/2001 | Zhang et al. | 382/103 |
| 6,302,527 B1 | 10/2001 | Walker | 347/50 |
| 6,307,956 B1 | 10/2001 | Black | 382/124 |
| 6,308,887 B1 | 10/2001 | Korman et al. | 235/379 |
| 6,330,976 B1 | 12/2001 | Dymetman et al. | 235/487 |
| 6,360,057 B1 | 3/2002 | Tsumagari et al. | 386/95 |
| 6,373,498 B1 | 4/2002 | Abgrall | 345/619 |
| 6,373,585 B1 | 4/2002 | Mastie et al. | 358/1.15 |
| 6,375,298 B2 | 4/2002 | Purcell et al. | 347/14 |
| 6,378,070 B1 | 4/2002 | Chan et al. | 713/155 |
| 6,417,435 B2 | 7/2002 | Chantzis et al. | 84/477 R |
| 6,421,738 B1 | 7/2002 | Ratan et al. | 719/328 |
| 6,439,465 B1 | 8/2002 | Bloomberg | 235/494 |
| 6,442,336 B1 | 8/2002 | Lemelson | 386/117 |
| 6,452,615 B1 | 9/2002 | Chiu et al. | 715/776 |
| 6,466,534 B2 | 10/2002 | Cundiff, Sr. | 720/612 |
| 6,476,793 B1 | 11/2002 | Motoyama et al. | 345/589 |
| 6,476,834 B1 | 11/2002 | Doval et al. | 715/863 |
| 6,502,114 B1 * | 12/2002 | Forcier | 715/273 |
| D468,277 S | 1/2003 | Sugiyama | D14/129 |
| 6,502,756 B1 | 1/2003 | Fåhraeus | 235/494 |
| 6,504,620 B1 | 1/2003 | Kinjo | 358/1.15 |
| 6,515,756 B1 | 2/2003 | Mastie et al. | 358/1.15 |
| 6,519,360 B1 | 2/2003 | Tanaka | 382/162 |
| 6,529,920 B1 | 3/2003 | Arons et al. | 715/268 |
| 6,535,639 B1 | 3/2003 | Uchihachi et al. | 382/225 |
| 6,544,294 B1 | 4/2003 | Greenfield et al. | 715/234 |
| 6,552,743 B1 | 4/2003 | Rissman | 348/207.2 |
| 6,568,595 B1 | 5/2003 | Wilz, Sr. et al. | 235/462.01 |
| 6,581,070 B1 | 6/2003 | Gibbon et al. | 707/104.1 |
| 6,587,859 B2 | 7/2003 | Dougherty et al. | 707/104.1 |
| 6,594,377 B1 | 7/2003 | Kim et al. | 382/117 |
| 6,611,276 B1 | 8/2003 | Muratori et al. | 715/772 |
| 6,611,622 B1 | 8/2003 | Krumm | 382/170 |
| 6,611,628 B1 | 8/2003 | Sekiguchi et al. | 382/243 |
| 6,625,334 B1 | 9/2003 | Shiota et al. | 382/305 |
| 6,647,535 B1 | 11/2003 | Bozdagi et al. | 715/255 |
| 6,654,887 B2 * | 11/2003 | Rhoads | 713/176 |
| 6,665,092 B2 | 12/2003 | Reed | 358/1.6 |
| 6,674,538 B2 | 1/2004 | Takahashi | 358/1.15 |
| 6,678,389 B1 | 1/2004 | Sun et al. | 382/100 |
| 6,687,383 B1 | 2/2004 | Kanevsky et al. | 382/100 |
| 6,700,566 B2 | 3/2004 | Shimoosawa et al. | 345/173 |
| 6,701,369 B1 | 3/2004 | Philyaw | 709/229 |
| 6,724,494 B1 | 4/2004 | Danknick | 358/1.14 |
| 6,728,466 B1 | 4/2004 | Tanaka | 386/46 |
| 6,745,234 B1 | 6/2004 | Philyaw et al. | 709/217 |

| | | | |
|---|---|---|---|
| 6,750,978 B1 | 6/2004 | Marggraff et al. | 358/1.12 |
| 6,753,883 B2 | 6/2004 | Schena et al. | 715/741 |
| 6,771,283 B2 | 8/2004 | Carro | 715/702 |
| 6,772,947 B2 | 8/2004 | Shaw | 235/462.01 |
| 6,774,951 B2 | 8/2004 | Narushima | 348/552 |
| 6,775,651 B1 | 8/2004 | Lewis et al. | 704/235 |
| 6,807,303 B1 | 10/2004 | Kim et al. | 382/203 |
| 6,824,044 B1 | 11/2004 | Lapstun et al. | 235/375 |
| 6,845,913 B2 | 1/2005 | Madding et al. | 235/462.13 |
| 6,853,980 B1 | 2/2005 | Ying et al. | 705/27 |
| 6,856,415 B1 | 2/2005 | Simchik et al. | 358/1.15 |
| 6,871,780 B2 | 3/2005 | Nygren et al. | 235/375 |
| 6,877,134 B1 * | 4/2005 | Fuller et al. | 715/202 |
| 6,883,162 B2 | 4/2005 | Jackson et al. | 717/124 |
| 6,886,750 B2 | 5/2005 | Rathus et al. | 235/462.15 |
| 6,892,193 B2 | 5/2005 | Bolle et al. | 706/20 |
| 6,898,709 B1 | 5/2005 | Teppler | 713/178 |
| 6,904,168 B1 | 6/2005 | Steinberg et al. | 382/165 |
| 6,923,721 B2 | 8/2005 | Luciano et al. | 463/24 |
| 6,931,594 B1 | 8/2005 | Jun | 715/719 |
| 6,938,202 B1 | 8/2005 | Matsubayashi et al. | 715/234 |
| 6,946,672 B1 | 9/2005 | Lapstun et al. | 250/566 |
| 6,950,623 B2 | 9/2005 | Brown et al. | 455/3.01 |
| 6,964,374 B1 | 11/2005 | Djuknic et al. | 235/462.01 |
| 6,966,495 B2 | 11/2005 | Lynggaard et al. | 235/472.01 |
| 6,983,482 B2 | 1/2006 | Morita et al. | 725/32 |
| 7,000,193 B1 | 2/2006 | Impink, Jr. et al. | 715/771 |
| 7,023,459 B2 | 4/2006 | Arndt et al. | 715/764 |
| 7,031,965 B1 | 4/2006 | Moriya et al. | 707/10 |
| 7,075,676 B2 | 7/2006 | Owen | 358/1.18 |
| 7,089,420 B1 | 8/2006 | Durst et al. | 713/176 |
| 7,092,568 B2 | 8/2006 | Eaton | 382/181 |
| 7,131,058 B1 | 10/2006 | Lapstun | 715/210 |
| 7,134,016 B1 | 11/2006 | Harris | 713/168 |
| 7,151,613 B1 | 12/2006 | Ito | 358/1.15 |
| 7,152,206 B1 | 12/2006 | Tsuruta | 715/202 |
| 7,162,690 B2 * | 1/2007 | Gupta et al. | 715/202 |
| 7,174,151 B2 | 2/2007 | Lynch et al. | 455/404.1 |
| 7,181,502 B2 | 2/2007 | Incertis | 709/217 |
| 7,196,808 B2 | 3/2007 | Kofman et al. | 358/1.15 |
| 7,280,738 B2 | 10/2007 | Kauffman et al. | 386/521 |
| 7,298,512 B2 | 11/2007 | Reese et al. | 358/1.15 |
| 2001/0003846 A1 | 6/2001 | Rowe et al. | 725/37 |
| 2001/0017714 A1 | 8/2001 | Komatsu et al. | 358/1.15 |
| 2001/0037408 A1 | 11/2001 | Thrift et al. | 719/328 |
| 2001/0052942 A1 | 12/2001 | MacCollum et al. | 348/207 |
| 2002/0001101 A1 | 1/2002 | Hamura et al. | 358/1.17 |
| 2002/0004807 A1 | 1/2002 | Graham et al. | 707/513 |
| 2002/0006100 A1 | 1/2002 | Cundiff, Sr. et al. | 369/75.2 |
| 2002/0010641 A1 | 1/2002 | Stevens et al. | 705/1 |
| 2002/0011518 A1 | 1/2002 | Goetz et al. | 235/375 |
| 2002/0015066 A1 | 2/2002 | Siwinski et al. | 347/19 |
| 2002/0023957 A1 | 2/2002 | Michaelis et al. | 235/454 |
| 2002/0048224 A1 | 4/2002 | Dygert et al. | 707/104.1 |
| 2002/0051010 A1 | 5/2002 | Jun et al. | 715/723 |
| 2002/0060748 A1 | 5/2002 | Aratani et al. | 348/553 |
| 2002/0066782 A1 | 6/2002 | Swaminathan et al. | 235/385 |
| 2002/0067503 A1 | 6/2002 | Hiatt | 709/201 |
| 2002/0087598 A1 | 7/2002 | Carro | 345/702 |
| 2002/0099534 A1 | 7/2002 | Hegarty | 704/275 |
| 2002/0101513 A1 | 8/2002 | Halverson | 348/207 |
| 2002/0131071 A1 | 9/2002 | Parry | 358/1.15 |
| 2002/0134699 A1 | 9/2002 | Bradfield et al. | 40/462.01 |
| 2002/0135800 A1 | 9/2002 | Dutta | 715/526 |
| 2002/0140993 A1 | 10/2002 | Silverbrook | 358/473 |
| 2002/0159637 A1 | 10/2002 | Echigo et al. | 382/190 |
| 2002/0165769 A1 | 11/2002 | Ogaki et al. | 705/14 |
| 2002/0169849 A1 | 11/2002 | Schroath | 709/217 |
| 2002/0171857 A1 | 11/2002 | Hisatomi et al. | 358/1.13 |
| 2002/0185533 A1 | 12/2002 | Shieh et al. | 235/441 |
| 2002/0199149 A1 | 12/2002 | Nagasaki et al. | 714/752 |
| 2003/0002068 A1 | 1/2003 | Constantin et al. | 358/1.15 |
| 2003/0007776 A1 | 1/2003 | Kameyama et al. | 386/68 |
| 2003/0014615 A1 | 1/2003 | Lynggaard | 345/179 |
| 2003/0024975 A1 | 2/2003 | Rajasekharan | 235/375 |
| 2003/0025951 A1 | 2/2003 | Pollard et al. | 358/504 |
| 2003/0038971 A1 | 2/2003 | Renda | 358/1.16 |
| 2003/0051214 A1 | 3/2003 | Graham et al. | 345/838 |
| 2003/0065925 A1 | 4/2003 | Shindo et al. | 713/189 |
| 2003/0076521 A1 | 4/2003 | Li et al. | 709/231 |
| 2003/0084462 A1 | 5/2003 | Kubota et al. | 725/141 |
| 2003/0088582 A1 | 5/2003 | Pflug | 345/716 |
| 2003/0093384 A1 | 5/2003 | Durst et al. | 705/1 |
| 2003/0110926 A1 | 6/2003 | Sitrick et al. | 84/477 R |
| 2003/0117652 A1 | 6/2003 | Lapstun | 235/494 |
| 2003/0121006 A1 | 6/2003 | Tabata et al. | 715/530 |
| 2003/0160898 A1 | 8/2003 | Baek et al. | 725/134 |
| 2003/0177240 A1 | 9/2003 | Gulko et al. | 704/226 |
| 2003/0187642 A1 | 10/2003 | Ponceleon et al. | 704/252 |
| 2003/0220988 A1 | 11/2003 | Hymel | 709/220 |
| 2003/0231198 A1 | 12/2003 | Janevski | 715/723 |
| 2004/0044894 A1 | 3/2004 | Lofgren et al. | 713/176 |
| 2004/0049681 A1 | 3/2004 | Diehl et al. | 713/178 |
| 2004/0118908 A1 | 6/2004 | Ando et al. | 235/385 |
| 2004/0125402 A1 | 7/2004 | Kanai et al. | 358/1.15 |
| 2004/0128514 A1 | 7/2004 | Rhoads | 713/189 |
| 2004/0128613 A1 | 7/2004 | Sinisi | 715/505 |
| 2004/0143459 A1 | 7/2004 | Engleson et al. | 700/9 |
| 2004/0143602 A1 | 7/2004 | Ruiz et al. | 340/506 |
| 2004/0156616 A1 | 8/2004 | Strub et al. | 386/83 |
| 2004/0167895 A1 | 8/2004 | Carro | 715/500.1 |
| 2004/0229195 A1 | 11/2004 | Marggraff et al. | 434/353 |
| 2004/0240541 A1 | 12/2004 | Chadwick et al. | 375/240 |
| 2004/0249650 A1 | 12/2004 | Freedman et al. | 379/265.06 |
| 2005/0064935 A1 | 3/2005 | Blanco | 463/43 |
| 2005/0083413 A1 | 4/2005 | Reed et al. | 348/211.2 |
| 2006/0043193 A1 | 3/2006 | Brock | 235/462.01 |
| 2006/0136343 A1 | 6/2006 | Coley et al. | 705/59 |
| 2006/0171559 A1 | 8/2006 | Rhoads | 382/100 |
| 2007/0033419 A1 | 2/2007 | Kocher et al. | 713/193 |

FOREIGN PATENT DOCUMENTS

| | | |
|---|---|---|
| CN | 1352765 A | 6/2002 |
| CN | 1097394 C | 12/2002 |
| EP | 1133170 A2 | 9/2001 |
| WO | WO 99/18523 | 4/1999 |
| WO | WO 02/082316 A1 | 10/2002 |

OTHER PUBLICATIONS

Chinese Application No. 2004100849823 Office Action, Jun. 1, 2007, 24 pages.

Chinese Application No. 2004100897988 Office Action, Apr. 6, 2007, 8 pages.

Lamming, M. et al., "Using Automatically Generated Descriptions of Human Activity to Index Multi-media Data," IEEE Multimedia Communications and Applications IEE Colloquium, Feb. 7, 1991, pp. 5/1-5/3.

Gropp, W. et al., "Using MPI-Portable Programming with the Message Passing Interface," copyright 1999, pp. 35-42, second edition, MIT Press.

Poon, K.M. et al., "Performance Analysis of Median Filtering on Meiko™—A Distributed Multiprocessor System," IEEE First International Conference on Algorithms and Architectures for Parallel Processing, 1995, pp. 631-639.

ASCII 24.com, [online] (date unknown), Retrieved from the Internet<URL: http://216.239.37.104/search?q= cache:z-G9M1EpvSUJ:ascii24.com/news/i/hard/article/1998/10/01/612952-000.html+%E3%82%B9%E3%...>.

Label Producer by Maxell, [online] [Retrieved on Nov. 11, 2003]. Retrieved from the Internet<URL: http://www.maxell.co.jp/products/consumer/rabel_card/>.

Movie-PhotoPrint by Canon, [online] [Retrieved on Nov. 11, 2003]. Retrieved from the Internet<URL: http://cweb.canon.jp/hps/guide/rimless.html>.

Print From Cellular Phone by Canon, [online] [Retrieved on Nov. 11, 2003]. Retrieved from the Internet<URL: http://cweb.canon.jp/bj/enjoy/pbeam/index.html>.

Print Images Plus Barcode by Fuji Xerox, [online] [Retrieved on Nov. 11, 2003]. Retrieved from the Internet<URL: http://www.fujixerox.co.jp/soft/cardgear/release.html>.

Print Scan-Talk By Barcode by Epson, [online] [Retrieved on Nov. 11, 2003]. Retrieved from the Internet<URL: http://www.epson.co.jp/osirase/2000/000217.htm>.

Printer With CD/DVD Tray, Print CD/DVD Label by Epson, [online] [Retrieved on Nov. 11, 2003]. Retrieved from the Internet<URL: http://www.i-love-epson.co.jp/products/printer/inkjet/pmd750/pmd7503.htm>.

R200 ScanTalk [online] (date unknown). Retrieved from the Internet<URL: http://homepage2.nifty.com/vasolza/ScanTalk.htm>.

Variety of Media In, Print Paper Out by Epson, [online] [Retrieved on Nov. 11, 2003]. Retrieved from the Internet<URL: http://www.i-love-epson.co.jp/products/spc/pma850/pma8503.htm>.

Communication Pursuant to Article 96(2) EPC, European Application No. 04255836.1, Jun. 11, 2007, 10 pages.

Stifelman, L. et al., "The Audio Notebook," SIGCHI 2001, Mar. 31-Apr. 5, 2001, pp. 182-189, vol. 3, No. 1, Seattle, WA.

Configuring A Printer (NT), Oxford Computer Support [online] [Retrieved on Nov. 13, 2003] Retrieved from the Internet<URL: http://www.nox.ac.uk/cehoxford/ccs/facilities/printers/configint.htm>.

"DocumentMall Secure Document Management" [online] [Retrieved on Mar. 9, 2004). Retrieved from the Internet <URL: http://www.documentmall.com>.

Girgensohn, Andreas et al., "Time-Constrained Keyframe Selection Technique," Multimedia Tools and Applications (2000), vol. 11, pp. 347-358.

Graham, Jamey et al., "A Paper-Based Interface for Video Browsing and Retrieval," IEEE International Conference on Multimedia and Expo (Jul. 6-9, 2003), vol. 2, P:II 749-752.

Graham, Jamey et al., "The Video Paper Multimedia Playback System," Proceedings of the 11th ACM International Conference on Multimedia (Nov. 2003), pp. 94-95.

Graham, Jamey et al., "Video Paper: A Paper-Based Interface for Skimming and Watching Video," International Conference on Consumer Electronics (Jun. 16-18, 2002), pp. 214-215.

Hull, Jonathan J. et al., "Visualizing Multimedia Content on Paper Documents: Components of Key Frame Selection for Video Paper," Proceedings of the 7th International Conference on Document Analysis and Recognition (2003), vol. 1, pp. 389-392.

"Kofax: Ascent Capture: Overview" [online] [Retrieved on Jan. 22, 2004]. Retrieved form the Internet: <URL http://www.kofax.com/products/ascent/capture>.

PostScript Language Document Structuring Conventions Specification, Version 3.0 (Sep. 25, 1992), Adobe Systems Incorporated.

Gopal, S. et al., "Load Balancing in a Heterogeneous Computing Environment," Proceedings of the Thirty-First Hawaii International Conference on System Sciences, Jan. 6-9, 1998.

Gropp, W. et al., "Using MPI—Portable Programming with the Message-Passing Interface," copyright 1999, pp. 35-42, second edition, MIT Press.

"Seiko Instruments USA, Inc.—Business and Home Office Products" online, date unknown, Seiko Instruments USA, Inc., [retrieved on Jan. 25, 2005]. Retrieved from the Internet: <URL: http://www.siibusinessproducts.com/products/link-ir-p-html>.

"Tasty FotoArt" [online], date unknown, Tague Technologies, Inc., [retrieved on Mar. 8, 3005]. Retrieved from the Internet <URL: http//www.tastyfotoart.com>.

Dimitrova, N. et al., "Applications of Video-Content Analysis and Retrieval," IEEE Multimedia, Jul.-Sep. 2002, pp. 42-55.

European Search Report, EP 04255836, Sep. 12, 2006, 4 pages.
European Search Report, EP 04255837, Sep. 5, 2006, 3 pages.
European Search Report, EP 04255839, Sep. 4, 2006, 3 pages.
European Search Report, EP 04255840, Sep. 12, 2006, 3 pages.

Graham, J. et al., "A Paper-Based Interface for Video Browsing and Retrieval," ICME '03, Jul. 6-9, 2003, pp. 749-752, vol. 2.

Graham, J. et al., "Video Paper: A Paper-Based Interface for Skimming and Watching Video," ICCE '02, Jun. 18-20, 2002, pp. 214-215.

Klemmer, S.R. et al., "Books With Voices: Paper Transcripts as a Tangible Interface to Oral Histories," CHI Letters, Apr. 5-10, 2003, pp. 89-96, vol. 5, Issue 1.

Minami, K. et al., "Video Handling with Music and Speech Detection," IEEE Multimedia, Jul.-Sep. 1998, pp. 17-25.

Shahraray, B. et al, "Automated Authoring of Hypermedia Documents of Video Programs," ACM, Multimedia '95 Electronic Proceedings, San Francisco, CA, Nov. 5-9, 1995, pp. 1-12.

Shahraray, B. et al., "Pictorial Transcripts: Multimedia Processing Applied to Digital Library Creation," IEEE, 1997, pp. 581-586.

Arai, T. et al., "PaperLink: A Technique for Hyperlinking from Real Paper to Electronic Content," CHI 97, Atlanta, GA, Mar. 22-27, 1997, pp. 327-334.

Hecht, D.L., "Printed Embedded Data Graphical User Interfaces," Computer, Mar. 2001, pp. 47-55, vol. 34, Issue 3.

Klemmer, S.R. et al., "Books with Voices; Paper Transcripts as a Tangible Interface to Oral Histories," CHI 2003, Fort Lauderdale, FL, Apr. 5-10, 2003, pp. 89-96.

* cited by examiner

```
<SCENE-SEG-MAP>
  - <MPEG>
      <VideoNo>2134</VideoNo>
      <Title>Ricoh Technology 2002</Title>
      <SCENE>
         <sceneNo>1</sceneNo>
         <begin>0</begin>
         <end>116453</end>
      </SCENE>
   - <SCENE>
         <sceneNo>2</sceneNo>
         <begin>116453</begin>
         <end>144750</end>
      </SCENE>
   - <SCENE>
         <sceneNo>3</sceneNo>
         <begin>144759</begin>
         <end>164890</end>
      </SCENE>
    </MPEG>
</SCENE-SEG-MAP>
```

PRINTING SYSTEM WITH EMBEDDED AUDIO/VIDEO CONTENT RECOGNITION AND PROCESSING

CROSS REFERENCE TO RELATED APPLICATIONS

This application claims the benefit of the following provisional patent applications, each of which is incorporated by reference in its entirety: U.S. Provisional Application No. 60/506,303, filed Sep. 25, 2003; and U.S. Provisional Application No. 60/506,302, filed Sep. 25, 2003.

This application is a continuation-in-part of the following co-pending patent applications (hereinafter, "the Video Paper patent applications"), each of which is each incorporated by reference in its entirety: U.S. application Ser. No. 10/001,895, filed Nov. 19, 2001 now U.S. Pat. No. 7,263,659; U.S. application Ser. No. 10/001,849, filed Nov. 19, 2001 now U.S. Pat. No. 7,263,671; U.S. application Ser. No. 10/001,893, filed Nov. 19, 2001 now U.S. Pat. No. 7,266,782; U.S. application Ser. No. 10/001,894, filed Nov. 19, 2001 now U.S. Pat. No. 7,149,957; U.S. application Ser. No. 10/001,891, filed Nov. 19, 2001; U.S. application Ser. No. 10/175,540, filed Jun. 18, 2002 now U.S. Pat. No. 7,215,436; and U.S. application Ser. No. 10/645,821, filed Aug. 20, 2003.

This application is also related to the following co-pending patent applications, each of which is incorporated by reference: U.S. patent application entitled, "Printer Having Embedded Functionality for Printing Time-Based Media," to Hart et al., filed Mar. 30, 2004, Ser. No. 10/814931, U.S. patent application entitled, "Networked Printing System Having Embedded Functionality for Printing Time-Based Media," to Hart et al., filed Mar. 30, 2004, Ser. No. 10/814948; U.S. patent application entitled, "Stand Alone Multimedia Printer Capable of Sharing Media Processing Tasks," to Hart et al., filed Mar. 30, 2004, Ser. No. 10/814386; U.S. patent application entitled, "Printer With Hardware and Software Interfaces for Peripheral Devices," to Hart et al., filed Mar. 30, 2004, Ser. No. 10/814932; U.S. patent application entitled, "Networked Printer With Hardware and Software Interfaces for Peripheral Devices," to Hart et al., filed Mar. 30, 2004, Ser. No. 10/814751; U.S. patent application entitled, "Stand Alone Printer With Hardware/Software Interfaces for Sharing Multimedia Processing," to Hart et al., filed Mar. 30, 2004, Ser. No. 10/813847, U.S. patent application entitled, "Printer User Interface," to Hart et al., filed Mar. 30, 2004, Ser. No. 10/814700; U.S. patent application entitled, "User Interface for Networked Printer," to Hart et al., filed Mar. 30, 2004, Ser. No. 10/814500; and U.S. patent application entitled, "Stand Alone Multimedia Printer With User Interface for Allocating Processing," to Hart et al., filed Mar. 30, 2004, Ser. No. 10/814845.

BACKGROUND

1. Field of the Invention

This invention relates generally to media content recognition and processing, and in particular to printing systems having embedded logic for audio and/or video content recognition and processing that can generate a printed representation for the audio and/or video content.

2. Background of the Invention

A conventional printer can receive documents or other data in a number of formats and then prints the contents of those documents or data in accordance with the proper format. But while conventional printers can print documents in a wide variety of formats, these printers are fundamentally limited in their ability to reproduce different kinds of media. For example, it is standard technology for a printer to produce images of static text, pictures, or a combination of the two. But because these printers print onto paper or another similar fixed medium, they cannot record the nuances of time-based media very well.

Accordingly, existing printers are not designed to generate multimedia documents, and there is no effective method for generating an easily readable representation of media content in any kind of printed format. Several different techniques and tools are available for accessing and navigating multimedia information (e.g., existing media renderers, such as Windows Media Player); however, none of these provide the user with the option of creating a multimedia document that the user can easily review and through which a user can gain access to media content.

There are many recognition and processing software applications that can be applied to audio or video content, for example, face recognition, scene detection, voice recognition, etc. But the limitations of existing printing systems described above reduce the utility of these applications. Without a paper-based or other printed representation of the processed media, the utility of these applications remains in the electronic domain. This is because the current state of the art requires a user to install and maintain these applications on a computer, which can only display the results electronically. Moreover, these applications often require significant resources of the computer, such as memory and processor speed, thus inhibiting their widespread use.

What is needed therefore is a printing system that is equipped to print time-based media without the limitations of conventional printers. It is further desirable that such a printer be able to perform at least some of the necessary processing itself rather than require an attached computer or other device to perform all of the processing.

SUMMARY OF THE INVENTION

To overcome at least some of the limitations of existing printing systems, a printing system in accordance with an embodiment of the invention includes embedded hardware and/or software modules for performing audio and/or video content recognition and processing. In addition, the printing system can generate a paper-based or other printed representation based on the results of the content recognition and processing performed on the audio and/or video content. In this way, a user can obtain a useful printed result of time-based media content based on any number of different processing needs. Moreover, packaging these capabilities on the printer relieves the resource burden on another device, such as an attached computer or a source device.

In one embodiment, a printer receives time-based media data that includes audio and/or video data. Using embedded software and/or hardware modules, the printer segments the data according to a content recognition and processing algorithm. The results of this algorithm may include one or more of: data for producing a printed representation of the media data, meta data corresponding to the segmentation of the media data, and an electronic representation of the media data. The printer then produces a printed output based on the segmentation of the media data, the printed output including for example samples of the media content where the content was segmented as well as information related to those samples. Using the printed representation of the time-based-media, the user can quickly view and access the media at desired places therein. The printer may also generate an electronic version of the media data, which may be identical to the received data or modified.

The printer's embedded content recognition and processing functionality can perform a variety of functions depending on the desired application for the printer. Without intending to limit the types of processing functions, in some embodiments the printer includes embedded modules for providing at least a portion of the processing for one or more of the following functionalities: video event detection, video foreground/background segmentation, face detection, face image matching, face recognition, face cataloging, video text localization, video optical character recognition, language translation, frame classification, clip classification, image stitching, audio reformatting, speech recognition, audio event detection, audio waveform matching, audio-caption alignment, caption alignment, and any combination thereof.

In one embodiment, the meta data produced from the media data are embedded within the printed representation, such as in a-bar code next to a sample. In another embodiment, the printer generates an electronic version of the media data that includes the meta data, which contain the segmentation information.

In another embodiment, a system for printing time-based media data includes a media renderer for viewing a selected media item, where the media renderer includes a print option. When a user selects the print function for a viewed media item, a printer driver sends the media item to a printer. The printer then segments the media item according to a content recognition algorithm and produces a printed output based on the segmented media item. The printed output includes a plurality of samples of the media item and information related to the samples. In this way, a media renderer can be equipped with a print function. In one embodiment, a plug-in module for a standard media renderer (e.g., Windows Media Player and Real Media Player) provides the print function, thus providing a print functionality for existing widely used renderers that currently do not have that capability. Once the print function is selected, the user can interact with the content recognition modules on the printer to create a printed representation of the media that represents the recognition routines that were applied to the selected media.

In addition to relieving external devices of the computation load required by various content recognition and processing algorithms, embedding these functionalities in the printer may allow for multiplatform functionality. Embedding functionalities within a printer also lead to greater compatibility among various systems, and it allows content recognition and processing in a printer that acts as a walk-up device in which no attached computer or other computing system is required.

DETAILED DESCRIPTION OF THE PREFERRED EMBODIMENTS

Various embodiments of a printing system include embedded functionality for performing content recognition algorithms on received media content. In this way, the printing systems can perform content-based functionalities on time-based media and then print the results of these operations in a useful and intelligent format. Depending on the desired application, the printing system may perform any among a number of content recognition and processing algorithms on the received media content. Moreover, the printing system may include any number of devices for receiving the media, printing the printed output, and producing the electronic output. Therefore, a number of embodiments of the printing system are described herein to show how such a system can be configured in a virtually limitless number of combinations to solve or address a great number of needs that exist.

System Overview

Figure 1:
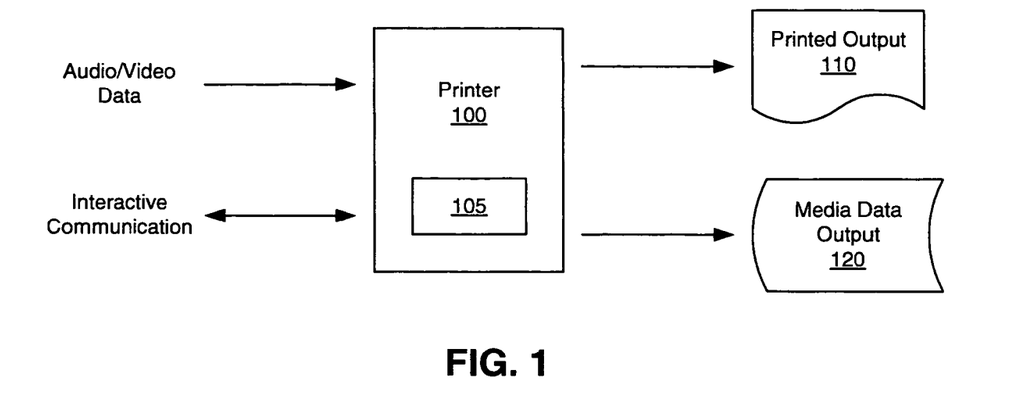
FIG. 1 is a diagram of an overview of an embodiment of a printing system with embedded audio and/or video content recognition and processing capabilities, in accordance with an embodiment of the invention.

FIG. 1 illustrates a multifunction printer 100 having embedded functionality in accordance with an embodiment of the invention. As FIG. 1 illustrates, the printer 100 can receive media data, which may include audio data, video data, or a combination thereof. The printer 100 includes embedded functional modules 105 for performing content recognition and processing and user interaction. The printer 100 may also use the modules 105 to create a printed output 110 and associated media data 120. The printer 100 can also communicate with a user through an external device, such as a computer system or other electronic device that can communicate commands and data with the printer 100. This interactive communication allows a user to interact with the embedded functionality within the printer 100, for example to provide commands to control how the printer 100 performs the content recognition and processing on the received media data.

Depending on the desired application, the functional modules 105 may perform any number of content recognition and processing algorithms, including video event detection, video foreground/background segmentation, face detection, face image matching, face recognition, face cataloging, video text localization, video optical character recognition, language translation, frame classification, clip classification, image stitching, audio reformatting, speech recognition, audio event detection, audio waveform matching, audio-caption alignment, caption alignment, and any combination thereof.

In one embodiment, the printer 100 is a multifunction-printer as described in co-pending U.S. patent application entitled, "Printer Having Embedded Functionality for Printing Time-Based Media," to Hart et al., filed Mar. 29, 2004, Ser. No. 10/814931, which application is incorporated by reference in its entirety; a networked multifunction printer as described in co-pending U.S. patent application entitled, "Networked Printing System Having Embedded Functionality for Printing Time-Based Media," to Hart et al., filed Mar. 29, 2004, Ser. No. 10/814948, which application is incorporated by reference in its entirety; or a stand-alone multifunction printing system as described in co-pending-U.S. patent application entitled, "Stand Alone Multimedia Printer Capable of Sharing Media Processing Tasks," to Hart et al., filed Mar. 29, 2004, Ser. No. 10/814386, which application is incorporated by reference in its entirety.

The printer 100 may receive the audio and/or video data from any of a number of sources, including a computer directly, a computer system via a network, a portable device with media storage (e.g., a video camera), a media broadcast to an embedded media receiver, or any of a number of different sources. Depending on the source, the printer 100 includes appropriate hardware and software interfaces for communicating therewith, such as the embodiments described in co-pending U.S. patent application entitled, "Printer With Hardware and Software Interfaces for Peripheral Devices," to Hart et al., filed Mar. 29, 2004, Ser. No. 10/814932; co-pending U.S. patent application entitled, "Networked Printer With Hardware and Software Interfaces for Peripheral Devices," to Hart et al., filed Mar. 29, 2004, Ser. No. 10/814751; and co-pending U.S. patent application entitled, "Stand Alone Printer With Hardware/Software Interfaces for Sharing Multimedia Processing," to Hart et al., filed Mar. 29, 2004, Ser. No. 10/814847; all of which are incorporated by reference in their entirety.

Moreover, the interactive communication can be provided by a user interface in the form of a display system, software for communicating with an attached display, or any number of embodiments as described in co-pending U.S. patent application entitled, "Printer User Interface," to Hart et al., filed Mar. 29, 2004, Ser. No. 10/814700; co-pending U.S. patent application entitled, "User Interface for Networked Printer," to Hart et al., filed Mar. 29, 2004, Ser. No. 10/814500; and co-pending U.S. patent application entitled, "Stand Alone Multimedia Printer With User Interface for Allocating Processing," to Hart et al., filed Mar. 29, 2004, Ser. No. 10/814845; all of which are incorporated by reference in their entirety.

Figure 2:
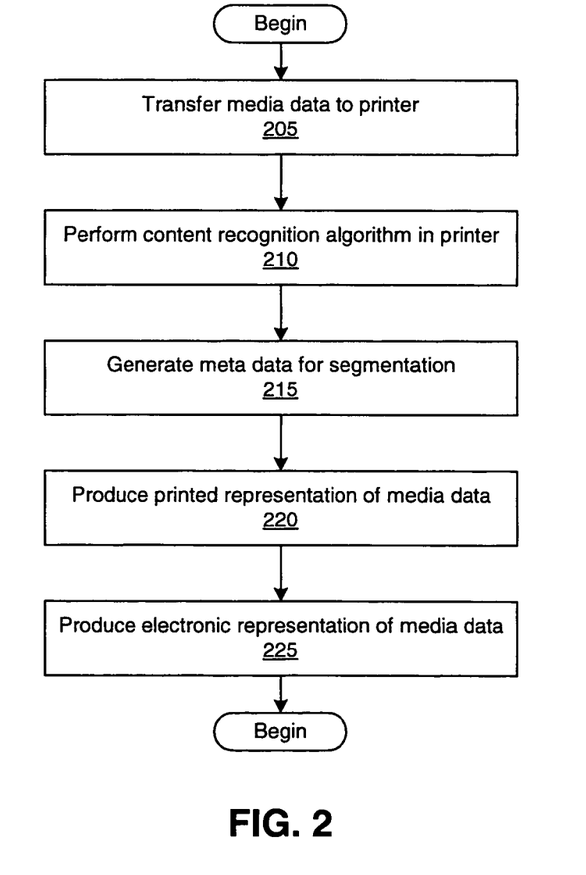
FIG. 2 shows the process flow of the operation of a printing system with embedded audio and/or video content recognition and processing capabilities, in accordance with an embodiment of the invention.

FIG. 2 illustrates a typical operational flow of one embodiment of the printer 100. To obtain a printed output of media data based on a content recognition and processing algorithm, a user transfers 205 the media data to the printer 100. As described above, the transferring 205 can be performed through any of a number of interfaces. The printer 100 then performs 210 a desired content recognition algorithm on the transferred media data. Which algorithm is performed, as well as parameters for the algorithm, may be selected by the user during interactive communication with the printer 100, as described in greater detail below. The result of the algorithm is to segment the time-based media data, which represents audio and/or video content. Segmenting the media data may result in a number of samples of the media data at various time locations in the data. Alternatively, segmenting the media data may result in a set of ranges, a set of start frames or times, a set of end frames or times, or any other set of data that results in a division or organization of the time-based media content.

Having segmented the media data, the printer 100 generates 215 meta data that describes the segmentation. In this way, the meta data can be associated with the segmented media data to indicate the location of particular samples of the media data within that content. The meta data may further include information about the segments or samples that define the segmentation. For example, the printer may employ a content recognition algorithm, such as a facial recognition algorithm, on a particular frame of data associated with a segment. The meta data could then include the result of the content recognition algorithm, such as the identity of the person recognized by the algorithm. The meta data may further include information for associating the segments or samples of the media data with their occurrence in the media data, using for example time stamps.

The printer then produces 220 a printed output 110 of the media data based on the results of the content recognition algorithm. The printed output 110 may include a representation of a sample from the media data as well as information obtained using the content recognition algorithm, which may describe the sample or associated segment. For example, the printed output 110 may include a number of entries, each of which contains an image of a face from a video data input, a name of a person associated with that face using a facial recognition algorithm, and other data such as a time stamp for when the face appeared in the video. The printer 100 may also encode information on the printer output 110, for example on a bar code, which includes information or indicia relating to the segment. In one embodiment, the printed output 110 is video paper, as described in the Video Paper patent applications, referenced above.

In one embodiment, the printer 100 also produces 225 an electronic representation of the media data 120, which representation may be identical to the received data, a reformatted version of the received data, or a modified version of the received data. Rather than being included on the printed output 110, the meta data that were generated 215 may be encoded entirely or in part within the electronic representation of the media data 120. In another embodiment, the media data are available by other means, so the printer 105 need not generate an additional media data output 120.

Figure 3:
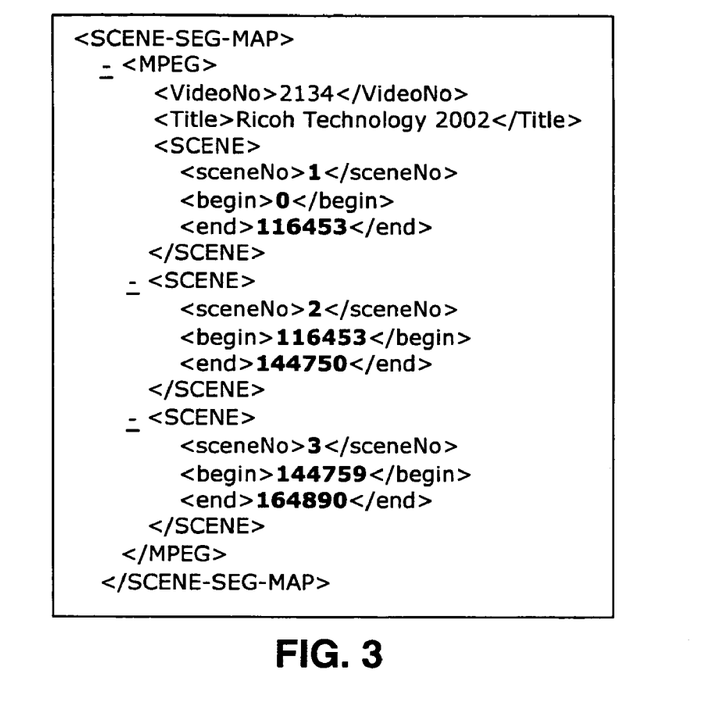
FIG. 3 shows an example of meta data that may be created for a segmentation, in accordance with an embodiment of the invention.

In this way, the printer 100 can be used to print time-based media data to create a useful and intelligent representation of a time-based even on a two-dimensional output. The content recognition algorithms can be selected to segment the time-based media data and to retrieve information from the data. The resulting segmentation and retrieved information are represented in a useful way on the printed output 110. By linking the printed output 110 with the media data output 120, for example using the meta data, the information presented in the printed output 110 can be easily associated with its actual occurrence. FIG. 3 illustrates an example of meta data used to link a segmented video file with its electronic representation. This enables a number of different embodiments for intelligent printers, described in greater detail below.

Printing Media from a Media Renderer

Figure 4:
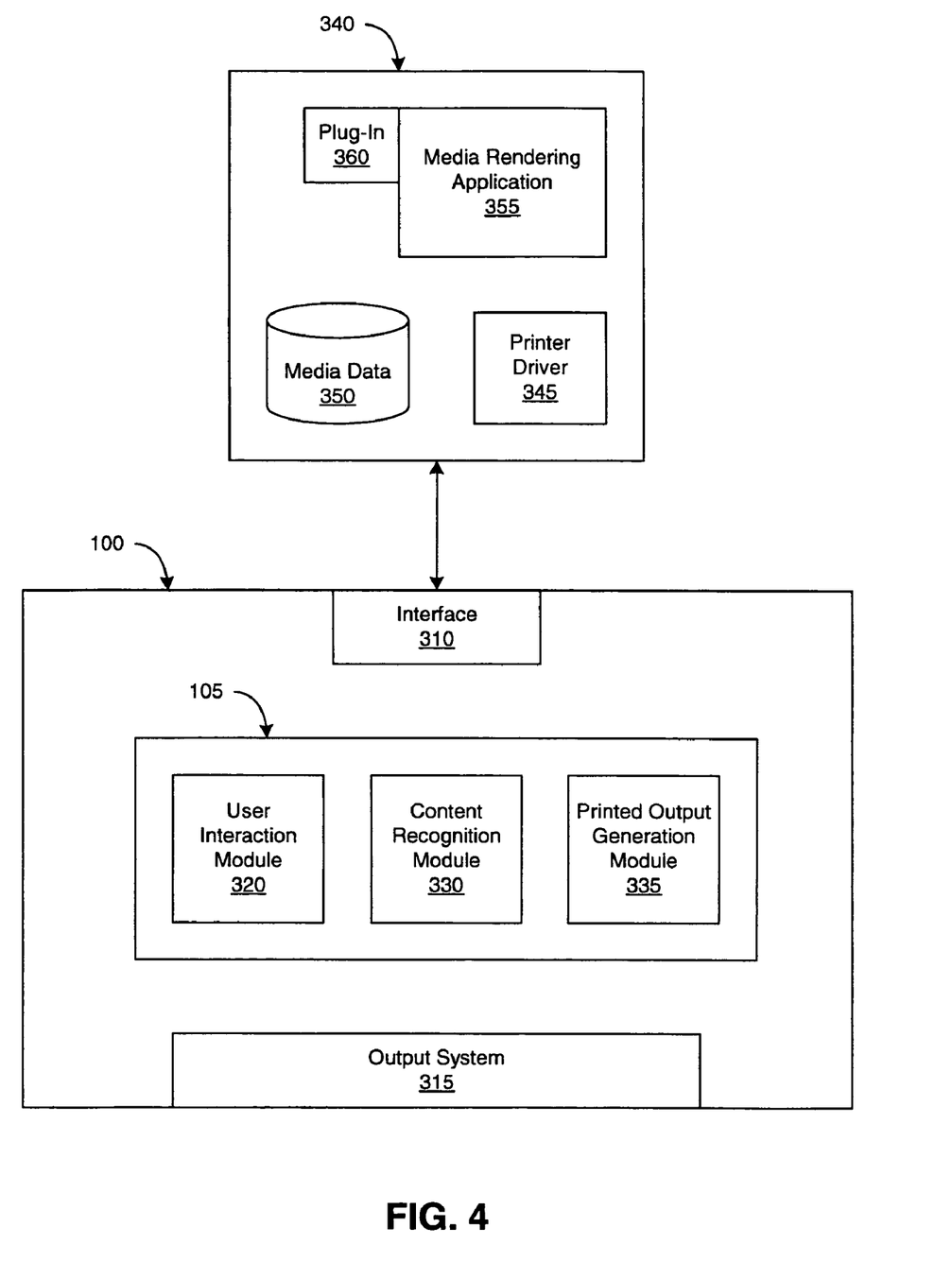
FIG. 4 is a diagram of one embodiment of a printing system coupled to an attached computing device equipped with a media rendering application, in accordance with an embodiment of the invention.

In one application, the printer 100 is used to create a printed representation of media data that is viewed on a computer. FIG. 4 shows an example environment in which a printer 100 is connected to a computer system 340 for printing media data. As shown, the printer 100 includes an interface 310 for communicating with the computer 340, an output system for producing printed and/or electronic representations of the media, and embedded functional modules 105. In the example shown, the printer 100 includes a user interaction module 320, a content recognition module 330, and a printed output generation module 335. The user interaction module 320 comprises hardware and/or software that allows the printer 100 to communicate control signals and media data with the computer 340 through the interface 310. The user interaction module 320 also allows the user to interact with the printer through the attached computer 340. The content recognition module 330 comprises hardware and/or software for performing the content recognition and processing of the media data, including the segmentation of the media data and the creation of the meta data. The printed output generation module 335 comprises hardware and/or software for generating the desired printed output using the output system 315 based on the results of the content recognition and segmentation. The output system 315 includes hardware for writing media data, such as a DVD writer, a secure digital writer, a network interface card, or any other suitable device for providing the media data output.

As described, the content recognition module 330 may perform any number of algorithms on the media data, including video event detection, video foreground/background segmentation, face detection, face image matching, face recognition, face cataloging, video text localization, video optical character recognition, language translation, frame classification, clip classification, image stitching, audio reformatting, speech recognition, audio event detection, audio waveform matching, audio-caption alignment, and caption alignment.

In this example, the computer 340 includes media data 350 storage for example on a storage device within or in communication with the computer 340. Installed on the computer 340 is a printer driver 345, which allows the computer 340 to communicate with the printer 100, including sending media data to be printed and print commands in a predefined printer language. In this embodiment, the computer 340 also includes a media rendering application 355, such as Windows Media Player or Real Media Player. Using the media rendering application 355, a user can play back media data on the computer, such as viewing video files and listening to audio files. The media rendering application 355 further includes a "print" function, which a user can select to initiate printing a currently viewed or opened media item, such as a video clip. Upon invocation of the print function, the printer driver 345 transfers the media data to the printer 100, instructs the printer 100 to apply one or more content recognition algorithms, and provides any appropriate parameters for those algorithms.

Figure 5:
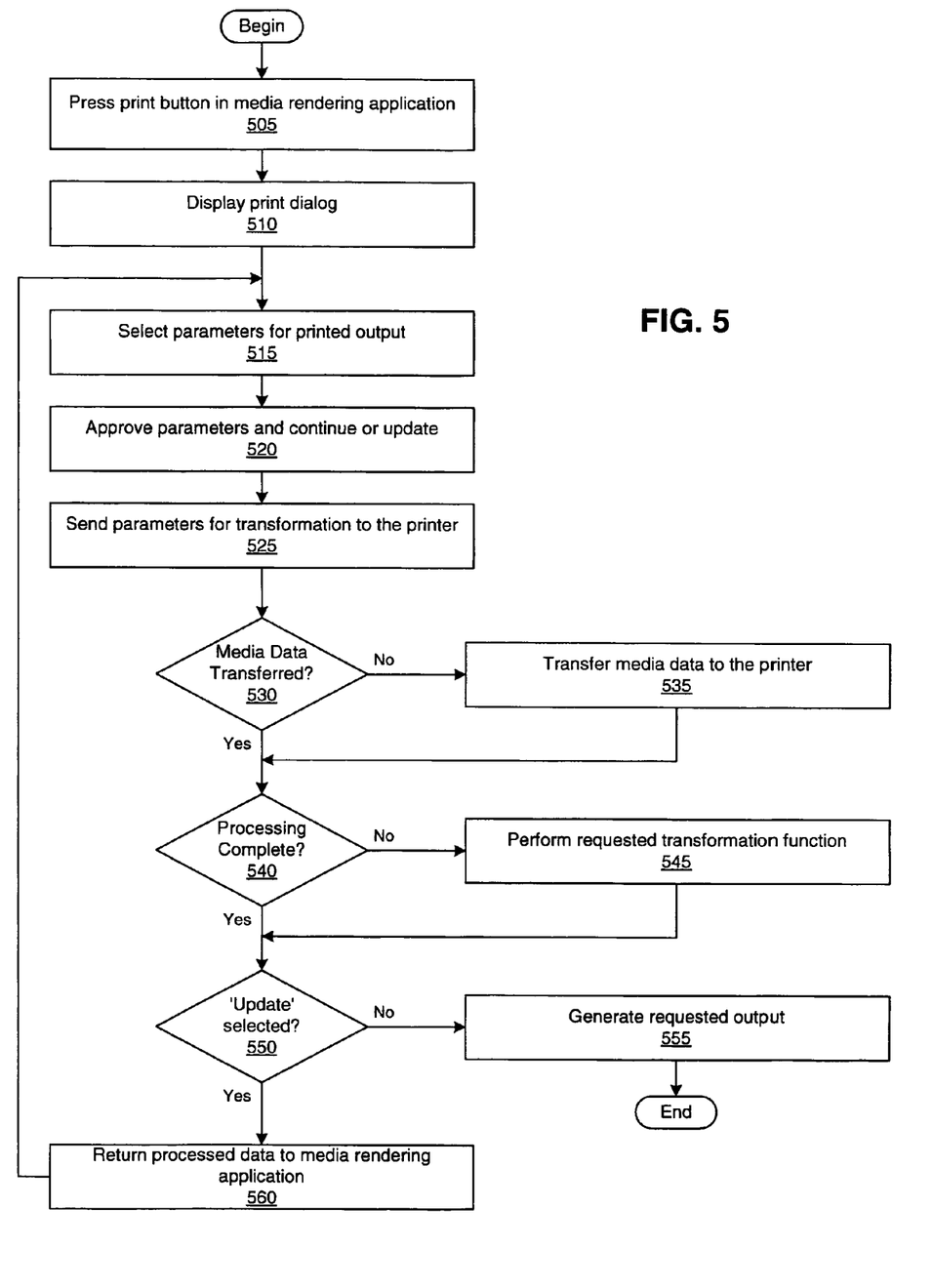
FIG. 5 is a flow diagram of the operation of the printing system and media renderer application, in accordance with an embodiment of the invention.
Figure 6:
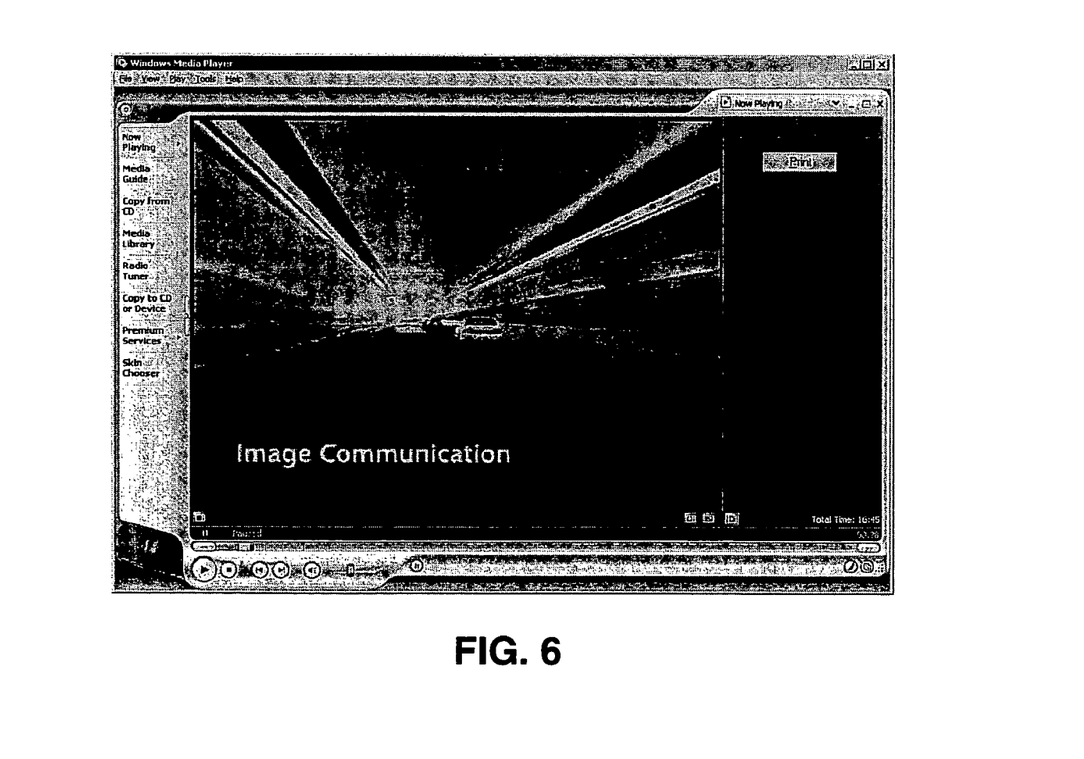
FIG. 6 is a screen shot of one embodiment of the media renderer application.
Figure 7:
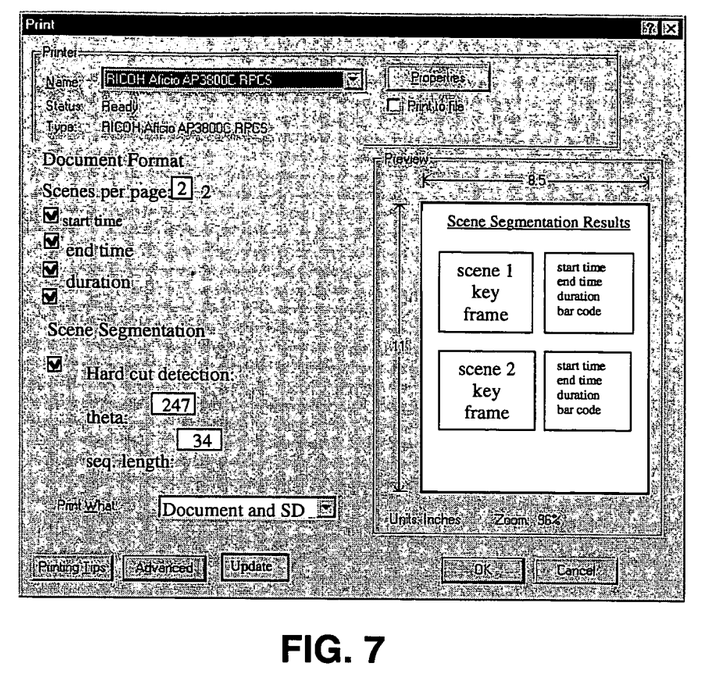
FIG. 7 is a screen shot of one embodiment of a print dialog window.

FIG. 5 illustrates one process for printing a media item using a media rendering application 355, such as that shown in the screen shot of FIG. 6. To initiate the printing process, a user presses 505 a print button or otherwise invokes the print function in the media rendering application 355. In response, the application 355 displays 510 a print dialog, such as that shown in FIG. 7. The print dialog allows the user to select 515 parameters for generation of the printed output. Although FIG. 7 is merely an example for a particular application, typical parameters that can be entered in the print dialog include a printer destination, document formatting options (including the types of information to be displayed on the printed output), parameters that affect the content recognition algorithm, and a destination for an electronic version of the media data.

Once the user selects 515 the desired parameters and approves 520 them by selecting an update or a print function, the printer driver 345 sends 525 the parameters to the printer 100. The update function is for directing the printer 100 to perform the desired processing and return a preview of the output to the printer dialog, while the print function is for directing the printer 100 to perform the desired processing and actually produce a corresponding output. If 530 the media data are not already transferred to the printer 100, the driver 345 sends 535 the media data to the printer 100 as well. With the media data and the parameters for transforming the media data known, the printer 100 can determine an appropriate printed output for the media data. If 540 this processing has not been completed, the printer performs 545 the requested function.

Figure 8:
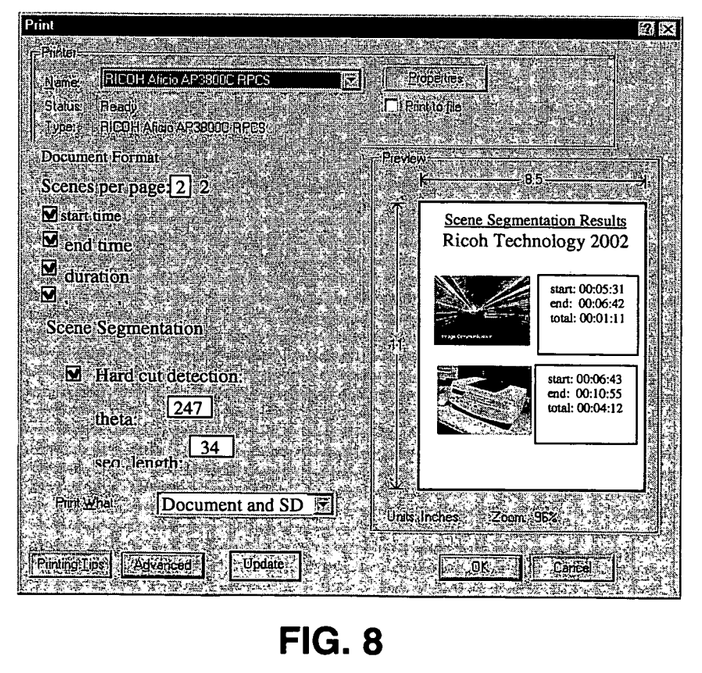
FIG. 8 is a screen shot of one embodiment of a print dialog window showing a preview of the printed output.

If 550 the user had selected the update function, the printer 100 returns 560 the processed data to the media rendering application 355 via the printer driver 345, and the media rendering application updates a preview of the output, as shown in FIG. 8. Otherwise, if 550 the user had selected the print function, the printer 100 generates 555 the requested printed output and electronic output, if any, according to the parameters and data from the print dialog. This step may include assignment of an identifier to the media data to link the printed and media data outputs. In this way, the user has printed a media item view from a media player, where the printed output represents the media data based on a selected content recognition functionality.

In the past, media renderers did not have a print function because, without the printer 100 described herein, there was no way for a user to generate a meaningful printout for an arbitrary video or audio file. With the printer 100 having embedded functional modules 105, as described herein, techniques for transforming media into two-dimensional representations inside the printer are provided. It thus becomes useful for a media renderer to have a print function, similar to a word processor or any other application that opens documents.

In one embodiment, the print functionality is provided by a plug-in module 360, which allows a standard media renderer to take advantage of the printing capabilities of the multifunction printer 100. For example, a print option can be added to the Windows Media Player (WMP) version 9 using the plug-in feature provided by Microsoft. The plug-in feature allows developers to create an application that supplements the WMP in some way. For instance, someone might write code that displays a graphic equalizer inside the WMP to show the frequency distribution for a particular audio track or the audio from a video file. Microsoft provides an explanation of what a plug-in is and how to build a plug-in at: "Building Windows Media Player and Windows Media Encoder Plug-ins" by David Wrede, dated November, 2002, which can be accessed through the Microsoft developer website at msdn.microsoft.com. As explained, several types of plug-in can be created, such as display, settings, metadata, window, and background. Using one of the user interface (UI) plug-in styles, a button or panel can be added to the WMP screen. If a button were added, for example, depending on the type of plug-in chosen, the button would be located in a specific area in the WMP's display window. The plug-in module 360 could thus be bundled and registered as a dynamically linked library (DLL), and the computer code for performing the desired action could be included in the DLL or invoked by the DLL when the button is pressed. In another embodiment, a print option is added to the File menu of WMP, using the "hooking" technique described in the Wrede article. Although this technique may be slightly less elegant than a plug-in, it would put a print option where it normally appears in most other document rendering applications.

FIG. 6 shows an example of a standard media player having a print function enabled by a plug-in module 360. To create an application that generates a printed representation from a given video file, the plug-in module 360 (e.g., in the form of a DLL) of the metadata type is created and a print button is placed on the right side of the video pane of the WMP application. Also installed on the computer 340 is a Video Paper application module (not shown), as described in the Video Paper patent applications, referenced above. The plug-in module 360 is programmed to invoke the Java application and pass it the necessary parameters that specify the layout of the video paper document. Typically, these include the number of key frames per page, their size, placement, and if any text is present (perhaps in a closed caption), how it should be formatted (e.g., point size, line length, justification, etc.). For example, if the video file currently loaded in the media rendering application 355 were from the media database 350 and it was in the MuVIE format (i.e., it includes metadata such as xml files and keyframes), then the invocation would pass an ID for the video file (e.g., 00043) plus a path name (d:/media) to the Video Paper application module along with default parameters. The Video Paper application module would create the video paper, for example in PDF form, and the video paper would be output 315 in electronic 120 or paper 110 form.

As explained, the print driver 345 allows for interactive communication between a user operating the computer 340 and the printer 100. Printer drivers are normally not designed to facilitate interactive information gathering. Because the print job can be redirected to another printer, or because printing protocols do not typically allow such interactive sessions, operating systems generally discourage interaction with the user by a print driver. Once initial printer settings are captured, further interactions are generally not allowed. One way to add this ability to a print driver is to embed metadata into the print stream itself. However, it is possible that the printer could need to ask the user for more information, in response to computations made from the data supplied by the user. In addition, the printer might itself delegate some tasks to other application servers, which might in turn need more information from the user. So-called "Web services" or "grid computing" systems are examples of the sort of application server that the printer might trigger.

In order to allow this interaction, without modifying printer driver architecture of the underlying operating system, an extra mechanism called a UI Listener is constructed. The UI Listener, a program that listens to a network socket, accepts requests for information, interacts with a user to obtain such data, and then sends the data back to the requester. Such a program might have a fixed set of possible interactions or accept a flexible command syntax that would allow the requester to display many different requests. An example of such a command syntax is a standard web browser's ability to display HTML forms. These forms are generated by a remote server and displayed by the browser, which then returns results to the server. A UI listener is different from a browser, though, in that a user does not generate the initial request to see a form. Instead, the remote machine generates this request. The UI listener is a server, not a client.

Because network transactions of this type are prone to many complex error conditions, a system of timeouts are used to assure robust operation. Normally, each message sent across a network either expects a reply or is a one-way message. Messages which expect replies generally have a timeout, a limited period of time during which it is acceptable for the reply to arrive. In this invention, embedded metadata would include metadata about a UI listener that will accept requests for further information. Such metadata consists of at least a network address, port number, and a timeout period. It might also include authentication information, designed to prevent malicious attempts to elicit information from the user. Since the user cannot tell whether the request is coming from a printer, a delegated server, or a malicious agent, prudence suggests strong authentication by the UI listener. If the printer or a delegated application server wishes more information, it can use the above noted information to request that the UI listener ask a user for the needed information.

Additional Applications for a Printer With Embedded Content Recognition Functionality In addition to the embodiments described, the multifunction printer 100 can be applied in many other configurations to achieve a variety of results. To illustrate the wide variety of uses for a printer having embedded content recognition functionality, a number of additional embodiments and applications for the printer are described. These embodiments are described to show the broad applicability for such a printer and are therefore not meant to limit the possible applications or uses for the printer.

Printer with Embedded Video Event Detection

When the user prints a video, a set of events (e.g., camera motion) are detected and used to generate a Video Paper document that provides index points to those events in the video. The document could also provide symbolic labels for each event. For example, "camera swipe, left-to-right, at 00:12:52."

Printer with Embedded Video Foreground/Background Segmentation

A printer with a video camera attached includes software for foreground/background segmentation. The printer monitors the appearance of people in the field of view and constructs a video or still-image record of people who walk up to the printer or pass by it. On a personal desktop printer, this system could learn what its owner looks like and store only a limited number of shots of that person (once per day, for example, to show what that person was wearing that day), and store images of the visitors to the office. Those images could be printed immediately, negating the need for on-printer storage, or they could be queued and formatted for printing later.

Printer with Embedded Face Image Detection

The user prints a JPEG or a video file and face image detection software frames the faces it detects. Software on the client device (the print dialog box) allows the user to print a zoomed-up version of a face image.

Printer with Embedded Face Image Matching

Every still image or video a user prints is subjected to face image extraction and matching against a database resident on the printer that's updated periodically by downloading from a central server. When a match is found, an alert is generated by email, over a speaker attached to the printer, or by refusing to print that document. This technology could be used by a photo lab to scan all the snapshots they print automatically, e.g., to look for terrorists.

Printer with Embedded Face Recognition

The user prints a video file, and the printer recognizes the face images it contains. A paper printout is provided that shows images of those faces, the symbolic recognition results, and where the face occurred in the video. This will substantially reduce the time needed for someone searching a video file for the instance of a particular individual. With this embodiment, a person can quickly scan a paper document rather than watching a recording.

Printer with Embedded Face Extraction, Matching, and Cataloging

A user prints a video or still picture file, and the face images it contains are extracted and stored on the printer. Subsequently, the printer monitors other video or still image files and, as they are printed, attempts to match the face images they contain to the database. From the print dialog box, the user can preview the face extraction results and cross index the face images in a given video to the videos that were printed before the present one. Special cover sheets can be provided to show the faces contained in a given video and the results of cross-indexing.

Printer with Embedded Video Text Localization

A user prints a video recording and the locations of all the text in the video are determined. This helps segment the video into scenes by changing text layouts. A cover sheet includes at least one frame from each such scene and lets a user browse through the video and see what text was captured. Printed time stamps or bar codes provide a method for randomly accessing the video. An example use would be printing a home video recording that contains somewhere within it a shot showing the storefront of a leather jacket shop in Barcelona. The user's attention would immediately be drawn to the point in the video containing this information, eliminating the need to watch more than an hour of video to find that point. Note that the reliability of video text localization can be much higher than with optical character recognition (OCR).

Printer with Embedded Video OCR

The user prints a video file and the text it contains is automatically recognized with an OCR algorithm. A paper printout can be generated that contains only the text or key frames selected from the video plus the text. This provides a conveniently browsable format that lets a user decide whether to watch a video recording.

Printer with Embedded Video Text Foreign Language Translation

The user prints a video file, which is then scanned with an OCR algorithm. The recognition results are translated into a foreign language and printed on a paper document together with key frames extracted from the video. The user can follow along while the video is playing and consult the paper document whenever necessary.

Printer with Embedded Video Frame Classification

A user prints a video and the printer classifies each frame into a number of known categories, such as "one person," "two people,""car," "cathedral," "tree," etc. These categories are printed next to each frame on a paper representation for the video. They can also be used, under control of a print dialog box, to generate a histogram of categories for the video that can be printed (like a MuVIE channel) on the printout. This lets a user browse the printout and locate, for example, the section of the home video recording that shows the cathedral in Barcelona.

Printer with Embedded Video Clip Classification

A user prints a video and the printer segments it into scenes and classifies each scene into a number of known categories, such as for example a group interview or a field report. The printout shows a representative key frame from each clip as well as the recognition result and a time stamp or bar code that provides a means for randomly accessing the video. In one example, this lets a user easily find the discussion among five news commentators that occurs sporadically on Fox News.

Printer with Embedded Trainable Video Clip Classification

A user prints a video and the printer segments it into scenes and classifies each one into a number of known categories. The user is presented a dialog box that shows the result of that classification and allows the user to manually classify each clip. The printer's clip classifier is updated with this information. The printout shows a representative key frame from each clip as well as the original recognition result, the manually assigned category, and a time stamp or bar code that provide a means for randomly accessing each clip.

Printer with Embedded Digital Image Stitching

The user prints a set of digital images that are intended for stitching. Under control of a print dialog box, these images are laid out horizontally, vertically, and transformed so that the final printed image has minimal distortion.

Printer with Embedded Audio Re-Formatter

The printer includes WAV to MP3 conversion hardware (and/or software). The user prints a WAV file, and a Video Paper document is output as well as an alternative version of the audio file (e.g., MP3 format) that can be played on a client device.

Printer with Embedded Speech Recognition

The user prints an audio file, which is passed through a speech recognition program. The recognized text is printed on a paper document. A representation is provided that indexes the words or phrases that were recognized with high confidence. The-print dialog box provides controls for modifying recognition thresholds and layout parameters.

Printer with Embedded Audio Event Detection

The user prints an audio file, and a set of events (e.g., shouting) are detected and used to generate a Video Paper document that provides index points to those events in the audio. The document could also provide symbolic labels for each event, for example, "loud shouting occurred at 00:12:52."

Printer with Embedded Audio Waveform Matching

A user prints an audio file. The printer uses a music-matching algorithm to find other recordings of the same piece. The user can choose which recording to print with the print dialog box. The result is a video paper printout, including a digital medium. The dialog box is another way to deliver music matching as a network service. If the client computer also has a microphone, the user could whistle the tune to the printer and it could find a professional recording.

Printer with Embedded Audio Foreign Language Translation

The user prints an audio or video file. The audio in the file is passed through speech recognition, and the results are automatically translated into another foreign language. A paper document is generated that shows the translated output.

Printer with Embedded Audio—Caption Alignment

The user prints an audio file and a text transcript of the audio file that is not aligned with the audio in the audio file. The printer aligns the two streams and prints a video paper version of the transcript. A symbolic version of the alignment result is printed on the document or returned digitally.

Printer with Embedded Video OCR and Caption Matching

The user prints a video recording that includes a closed caption. The text in the video is recognized with an OCR algorithm, and the text that occurs in both the video and the closed caption is used as a cue for key frame selection. Key frames nearby those events are printed on a paper document together with a highlighted form of the text that occurred in both channels.

Printer with Embedded Closed Caption Extraction and Reformatting

The user prints a video file, and the closed caption is extracted from the file and reformatted on a paper document together with key frames extracted from the video. This lets a user browse the recording and read what was said, thus substantially improving the efficiency of someone who needs to review hours of video.

Printer with Embedded TV News Segmentation and Formatting

A user prints a TV news program. Because of the specialized format of a typical news program, the printer can apply special video segmentation and person identification routines to the video. The transcript can be formatted more like a newspaper with embedded headlines that make it easy for someone to browse the paper document.

Printer with Embedded Audio Book Speech Recognition and Formatting Software

The user prints an audio book recording. Because the original data file contains a limited number of speakers, the speech recognition software is trained across the file first. The recognition results can be formatted to appear like a book, taking into account the dialog that that occurs, and printed on an output document. This may be useful for people who have the tape but not the original book.

Printer with Embedded Audio Book Foreign Language Translation and Formatting

The specialized audio book recognition system is applied first, as described above, and the results are input to translation software before layout and printing in a specialized format.

Route Planning and Mapping

In a printer with embedded map generation software for routing, the user enters an address on a print dialog box. The printer then generates a map that shows the location of that address.

In a printer with embedded route planning, the user enters two addresses on a print dialog box. The printer calculates a route between them (e.g., using A*). A multi-page map format is then generated, improving upon the standard computer-generated map from the Internet.

General Comments

While examples of suitable printing systems are described above, the description of the printer and its document production means is not meant to be limiting. Depending on the intended application, a printer can take many different forms other than the typical office or home-use printer with which most people are familiar. Therefore, it should be understood that the definition of a printer includes any device that is capable of producing an image, words, or any other markings on a surface. Although printing on paper is discussed above, it should be understood that a printer in accordance with various embodiments of the present invention could produce an image, words, or other markings onto a variety of tangible media, such as transparency sheets for overhead projectors, film, slides, canvass, glass, stickers, or any other medium that accepts such markings.

In addition, the description and use of media and media data are not meant to be limiting, as media include any information, tangible or intangible, used to represent any kind of media or multimedia content, such as all or part of an audio and/or video file, a data stream having media content, or a transmission of media content. Media may include one or a combination of audio (including music, radio broadcasts, recordings, advertisements, etc.), video (including movies, video clips, television broadcasts, advertisements, etc.), software (including video games, multimedia programs, graphics software, etc.), and pictures (including still images in jpeg, gif, tif, jpeg2000, pdf, and other still image formats); however, this listing is not exhaustive. Furthermore, media and media data may further include anything that itself comprises media or media data, in whole or in part, and media data includes data that describes a real-world event. Media data can be encoded using any encoding technology, such as MPEG in the case of video and MP3 in the case of audio. They may also be encrypted to protect their content using an encryption algorithm, such as DES, triple DES, or any other suitable encryption technique.

Moreover, any of the steps, operations, or processes described herein can be performed or implemented with one or more software modules or hardware modules, alone or in combination with other devices. It should further be understood that portions of the printer described in terms of hardware elements may be implemented with software, and that software elements may be implemented with hardware, such as hard-coded into a dedicated circuit. In one embodiment, a software module is implemented with a computer program product comprising a computer-readable medium containing computer program code, which can be executed by a computer processor for performing the steps, operations, or processes described herein.

In alternative embodiments, the printer can use multiple application servers, acting in cooperation. Any of the requests or messages sent or received by the printer can be sent across a network, using local cables such as IEEE1394, Universal Serial Bus, using wireless networks such as IEEE 802.11 or IEEE 802.15 networks, or in any combination of the above.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

We claim:

1. A system for printing time-based media based on content therein, the printing system comprising:
    an interface for receiving media data;
    a content recognition module that segments the media data according to a content recognition algorithm; and
    an output system that produces a printed output based on the segmented media data, the printed output including a plurality of samples of the media data that correspond to the segmented media data.

2. The system of claim 1, wherein the content recognition module further generates meta data that describe how the media data are segmented, the meta data associating the printed output with an electronic version of the media data.

3. The system of claim 2, wherein the output system further produces an electronic version of the media data.

4. The system of claim 3, wherein the electronic version of the media data includes the meta data.

5. The system of claim 1, wherein the media data include audio data.

6. The system of claim 1, wherein the media data include video data.

7. The system of claim 6, wherein the content recognition module identifies a plurality of key frames for the video data.

8. The system of claim 7, wherein the printed output includes the identified key frames and, for each key frame, a corresponding indicia that relates the key frame to an electronic version of the media data.

9. The system of claim 8, wherein the indicia for a key frame comprises a machine-readable bar code.

10. The system of claim 8, wherein the indicia for each key frame associates the key frame with its position in the media data.

11. The system of claim 1, wherein the content recognition algorithm performs video event detection.

12. The system of claim 1, wherein the content recognition algorithm performs video foreground/background segmentation.

13. The system of claim 1, wherein the content recognition algorithm performs face detection.

14. The system of claim 1, wherein the content recognition algorithm performs face image matching.

15. The system of claim 1, wherein the content recognition algorithm performs face recognition.

16. The system of claim 1, wherein the content recognition algorithm performs face cataloging.

17. The system of claim 1, wherein the content recognition algorithm performs video text localization.

18. The system of claim 1, wherein the content recognition algorithm performs video optical character recognition.

19. The system of claim 1, wherein the content recognition algorithm performs language translation.

20. The system of claim 1, wherein the content recognition algorithm performs frame classification.

21. The system of claim 1, wherein the content recognition algorithm performs clip classification.

22. The system of claim 1, wherein the content recognition algorithm performs image stitching.

23. The system of claim 1, wherein the content recognition algorithm performs audio reformatting.

24. The system of claim 1, wherein the content recognition algorithm performs speech recognition.

25. The system of claim 1, wherein the content recognition algorithm performs audio event detection.

26. The system of claim 1, wherein the content recognition algorithm performs audio waveform matching.

27. The system of claim 1, wherein the content recognition algorithm performs audio-caption alignment.

28. The system of claim 1, wherein the content recognition algorithm performs caption alignment.

29. A system for printing media content, the system comprising:
a media renderer for viewing a selected media item, the media renderer including a print option;
a printer driver configured to send the selected media item to a printer responsive to user selection of the print option of the media renderer; and
a printer coupled to the printer driver to receive the media item, the printer configured to segment the media item according to a content recognition algorithm and produce a printed output based on the segmented media item, the printed output including a plurality of samples of the media item and information related to the samples.

30. The system of claim 29, wherein the media renderer comprises a computer program product configured to run on a computer system coupled to the printer.

31. The system of claim 29, wherein the media renderer comprises a plug-in software module that provides the print option.

32. The system of claim 29, wherein the printer is configured to generate meta data that describe how the media item is segmented, the meta data associating the printed output with an electronic version of the media item.

33. The system of claim 32, wherein the printer is further configured to produce an electronic version of the media data.

34. The system of claim 33, wherein the electronic version of the media data includes the meta data.

35. The system of claim 29, wherein the media item is an audio file.

36. The system of claim 29, wherein the media item is a video file.

37. The system of claim 29, wherein the printer identifies a plurality of key frames for the media item when the printer segments the media item.

38. The system of claim 37, wherein the printed output includes the identified key frames and, for each key frame, a corresponding indicia that relates the key frame to an electronic version of the media item.

39. The system of claim 38, wherein the indicia for a key frame comprises a machine-readable bar code.

40. The system of claim 38, wherein the indicia for each key frame associates the key frame with its position in the media item.

41. The system of claim 29, wherein the content recognition algorithm performs a function selected from a group consisting of: video event detection, video foreground/background segmentation, face detection, face image matching, face recognition, face cataloging, video text localization, video optical character recognition, language translation, frame classification, clip classification, image stitching, audio reformatting, speech recognition, audio event detection, audio waveform matching, audio-caption alignment, caption alignment.

42. A method of printing media content, the method comprising:
receiving time-based media data that represent the media content;
a step for segmenting the media data based on the media content, the step for segmenting performed at least in part by a printing system; and
producing a printed output based on the segmented media data, the printed output displaying a plurality of samples of the media content.

43. The method of claim 42, further comprising:
generating meta data that describe how the media data are segmented, the meta data associating the printed output with an electronic version of the media data.

44. The method of claim 43, further comprising:
producing an electronic version of the media data.

45. The method of claim 44, wherein the electronic version of the media data includes the meta data.

46. The method of claim 42, wherein the media data include audio data.

47. The method of claim 42, wherein the media data include video data.

48. The method of claim 47, wherein the step for segmenting the media data includes identifying a plurality of key frames for the video data.

49. The method of claim 48, wherein the printed output includes the identified key frames and, for each key frame, a corresponding indicia that relates the key frame to an electronic version of the media data.

50. The method of claim 49, wherein the indicia for a key frame comprises a machine-readable bar code.

51. The method of claim 49, wherein the indicia for each key frame associates the key frame with its position in the media data.

52. The method of claim 42, wherein the step for segmenting includes a content recognition algorithm that performs a function selected from a group consisting of: video event detection, video foreground/background segmentation, face detection, face image matching, face recognition, face cataloging, video text localization, video optical character recognition, language translation, frame classification, clip classification, image stitching, audio reformatting, speech recognition, audio event detection, audio waveform matching, audio-caption alignment, caption alignment.

* * * * *